Feb. 3, 1970  J. F. POLIZZOTTO  3,492,835
TELESCOPING DRIVE SHAFT
Filed June 14, 1968

*INVENTOR.*
JOSEPH F. POLIZZOTTO

United States Patent Office 3,492,835
Patented Feb. 3, 1970

3,492,835
TELESCOPING DRIVE SHAFT
Joseph F. Polizzotto, Babylon, N.Y., assignor to OPTOmechanisms, Inc., Plainview, N.Y.
Filed June 14, 1968, Ser. No. 737,242
Int. Cl. F16d *3/06, 7/02*
U.S. Cl. 64—23                                                3 Claims

ABSTRACT OF THE DISCLOSURE

A self-aligning drive shaft, having inner and outer telescoping members. The members are connected by spring loaded roller bearings mounted on one end of the inner member and bearing against the inner wall of the outer member. The connection accommodates misaligned inner and outer members, has low resistance to axial movement and substantially no rotational backlash.

---

This invention relates to telescoping drive shafts and, more particularly, to roller bearing connected shafts.

Conventional telescoping parallel side spline shafts connections generally must be very carefully aligned or they will bind, which cannot be tolerated in precision apparatus. The present invention provides a shaft connection wherein the inner shaft member is hollow and slotted at one end and has equally spaced bearings. The slotted portions separate the bearings and are pre-stressed so that they form springs, urging the bearings outwardly against the inner wall of the outer member.

Three equally spaced roller bearings are used, which permits substantial misalignment of the inner and outer shaft members without any binding.

The present invention has the following features:
(1) Anti-backlash movement in transmitting rotational torque.
(2) In and out movement of the inner and outer tubes shall be self-aligning and not require adjustment.
(3) Force required to actuate in and out movement is low (50 grams).
(4) Travel of the inner tube with respect to the outer tube is a least 4.5 inches.
(5) Speeds to 2000 r.p.m. are obtainable without balancing problems.
(6) Lubrication is not required.

More specifically referring to the above features:
(1) *Backlash.*—Parallel side splines used in the automotive industry, inherently has backlash built into it. The present telescoping shafts are anti-backlash due to the pre-loaded bearings.
(2) *Alignment.*—The three point pre-loaded condition of the bearings will permit misalignment of the inner shaft and outer shaft. All standard ball or parallel-side splines must have a critical alignment of the inner to outer tube.
(3) Large roller bearings instead of steel balls are used in the present spline, which permits a lower rolling force due to the difference in diameter of the rollers. Parallel-side splines have high friction loads inherent in these designs.
(4) An infinite travel is possible in the roller bearing telescoping shaft due to its self aligning feature. Conventional ball splines tend to bind as do parallel-side splines.
(5) The unit is symmetrical and should balance.
(6) The ball bearings are prelubricated, and lubrication is not required. Standard parallel-side and ball splines require lubrication.

Accordingly, a principal object of the invention is to provide new and improved telescoping shaft means.

Another object of the invention is to provide new and improved self aligning telescoping shaft means.

Another object of the invention is to provide new and improved telescoping shaft means having low resistance to axial relative movement of the shaft members.

Another object of the invention is to provide new and new and improved telescoping shaft means having low rotational backlash Another object of the invention is to provide new and improved telescoping shaft means which are adapted to accommodate substantial misalignment of the shaft members without binding.

Another object of the invention is to provide self aligning telescoping shaft means comprising an outer tube member, an inner shaft member adapted to fit inside said outer tube member, a plurality of bearings mounted at one end of said inner tube member, said bearings being adapted to bear against the inner wall of said outer tube.

These and other objects of the invention will be apparent in the following specification and drawings, of which:

Figure 1:
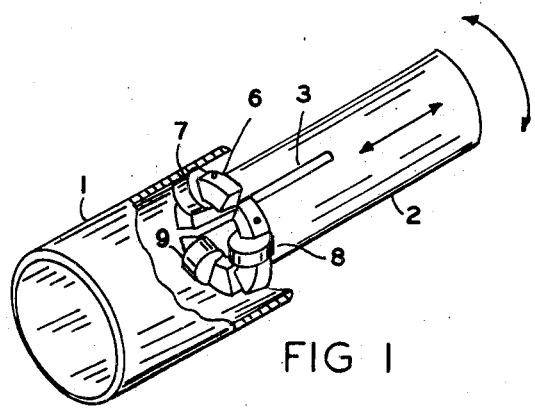
FIGURE 1 is a perspective view of the embodiment of the invention.
Figure 2:
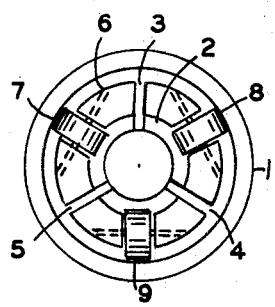
FIGURE 2 is an end view of the embodiment of FIGURE 1.

Referring to the figures, the invention generally comprises two telescoping shaft members, an outer member 1 and an inner member 2. Both of these members are hollow at least at the connection end. The inner member has a plurality of equally spaced slots, 3, 4, 5, and preferably has a collar member 6, which has corresponding slots. The purpose of the collar member is for mounting the roller bearings 7, 8, 9, which are pinned into mounting apertures in the collar 6.

The inner member is made of a material which will provide a spring action such as phosphor bronze, so that the extending portions formed by the slots become spring members upon which the bearings are mounted and the spring members are pre-stressed so that the spring force urges the bearings against the inner wall of the outer member 1.

As shown in FIGURE 1, an arrangement of three bearings has been found successful and provides a mounting which will accommodate substantial misalignment of the outer and inner members 1 and 2. Due to the bearings, there is very low resistance to axial movement of the member 2 with respect to the member 1. The rotational torque is transmitted through the bearing connection with substantially no backlash, since the spring members will provide sufficient pressure to hold the bearings in position on the outer member while transmitting substantial torque.

This invention has been found particularly useful in precision apparatus where it is difficult to align major subassemblies and where conventional spline shafts were caused to bind and whereby any misalignment occurred.

Many modifications may be made by those who desire to practice the invention without departing from the scope thereof which is defined by the following claims.

I claim:
1. Self aligning drive shaft means comprising:
   an outer tube member,
   an inner shaft member adapted to fit inside said outer tube member,
   a plurality of bearings mounted at one end of said inner tube member, said bearings being adapted to bear against the inner wall of said outer tube, said inner member being hollow at said one end and having a plurality of equally spaced slots therein, said bearings being mounted in said slots.
2. Apparatus as in claim 1 wherein said inner member is of springable material to provide a spring force urging said bearings outwardly against said inner wall of said outer member.

3. Apparatus as in claim 2 wherein said inner member has a slotted collar at said one end to mount said bearings.

References Cited

UNITED STATES PATENTS

| | | |
|---|---|---|
| 2,050,497 | 8/1936 | McCollum. |
| 2,441,038 | 5/1948 | Siesel _____ 64—29 |
| 2,861,437 | 11/1958 | Bachman _____ 64—15 |
| 3,096,453 | 7/1963 | Behar _____ 64—30 X |
| 3,176,478 | 4/1965 | House _____ 64—23 |

HALL C. COE, Primary Examiner

U.S. Cl. X.R.

64—30